United States Patent
Hui et al.

(10) Patent No.: US 9,401,863 B2
(45) Date of Patent: Jul. 26, 2016

(54) DYNAMIC SOURCE ROUTE COMPUTATION TO AVOID SELF-INTERFERENCE

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 200 days.

(21) Appl. No.: 14/136,425

(22) Filed: Dec. 20, 2013

(65) Prior Publication Data
US 2015/0180772 A1    Jun. 25, 2015

(51) Int. Cl.
  *H04L 12/721*  (2013.01)
  *H04W 40/16*  (2009.01)
  *H04B 3/54*  (2006.01)
  *H04L 12/753*  (2013.01)

(52) U.S. Cl.
  CPC ............. *H04L 45/72* (2013.01); *H04W 40/16* (2013.01); *H04B 3/54* (2013.01); *H04L 45/48* (2013.01)

(58) Field of Classification Search
  None
  See application file for complete search history.

(56) References Cited

U.S. PATENT DOCUMENTS

| 7,570,593 B1 * | 8/2009 | ElBatt ................... H04L 45/122 370/238 |
| 2006/0153081 A1 * | 7/2006 | Simonsson ............. H04L 45/00 370/238 |

(Continued)

FOREIGN PATENT DOCUMENTS

WO     2008097221 A1     8/2008

OTHER PUBLICATIONS

Bertossi, Alan and Bonuccelli, Maurizio, Code Assignment for Hidden Terminal Interference Avoidance in Multihop Packet Radio Networks, IEEE Trans. on Networking, vol. 3, No. 4, Aug. 1995, p. 441.*

(Continued)

*Primary Examiner* — Noel Beharry
*Assistant Examiner* — Rodrick Mak
(74) *Attorney, Agent, or Firm* — Johnson, Marcou & Isaacs, LLC

(57) ABSTRACT

In a multiple interface, low power and lossy network comprising a plurality of devices, interface options for a source route to minimize self-interferences are desired. The ability to request a interface technology for a device to use with neighboring devices allows multiple transmissions to occur simultaneously without interfering with each other. A root phase device obtains interface option information from the devices. Each device in a network path determines the interface options available, such as powerline communications ("PLC") and radio frequency ("RF"). The device transmits the interface options to the parent device. The parent device transmits the interface options up the network path toward the root phase device, which collects the interface options and determines transmission routes to any needed endpoint device. The transmission route will comprise the device routes and a interface option for each hop from a parent device to a child device.

17 Claims, 7 Drawing Sheets

(56) References Cited

U.S. PATENT DOCUMENTS

| | | | |
|---|---|---|---|
| 2007/0082616 A1* | 4/2007 | Bird | H04L 45/00 455/63.1 |
| 2008/0039101 A1* | 2/2008 | Callaway | H04L 45/26 455/445 |
| 2008/0198786 A1* | 8/2008 | Nieto | H04L 1/1867 370/315 |
| 2008/0279101 A1 | 11/2008 | Wu et al. | |
| 2011/0105094 A1* | 5/2011 | Hassan | H04N 21/41407 455/418 |
| 2012/0230370 A1* | 9/2012 | Shaffer | H04B 1/713 375/133 |
| 2012/0320768 A1* | 12/2012 | Shaffer | H04W 40/16 370/252 |
| 2013/0103795 A1* | 4/2013 | Kulkarni | H04L 67/125 709/217 |
| 2013/0183971 A1* | 7/2013 | Tamaki | H04W 36/0061 455/436 |
| 2014/0006893 A1* | 1/2014 | Shetty | H04L 1/1867 714/749 |
| 2014/0108786 A1* | 4/2014 | Kreft | G06F 21/71 713/156 |
| 2015/0230056 A1* | 8/2015 | Shin | H04W 4/008 455/420 |

OTHER PUBLICATIONS

Garcia Bolos, International Search Report and Written Opinion issued in International Application No. PCT/US2014/069415, Feb. 27, 2015, 1-148.

Hu, et al., "The Dynamic Source Routing Protocol (DSR) for Mobile Ad Hoc Networks for IPv4; rfc4728.txt", Johnson Rice University; Feb. 1, 2007, XP015055045, ISSN: 0000-0003, Feb. 1, 2007, 1-107.

* cited by examiner

DYNAMIC SOURCE ROUTE COMPUTATION TO AVOID SELF-INTERFERENCE

TECHNICAL FIELD

The present disclosure relates generally to computer networks and, more particularly, to determining communication options for a source route for devices in a network to minimize self-interferences.

BACKGROUND

Constrained networks include, for example, Low power and Lossy Networks (LLNs), such as sensor networks. These constrained networks have a myriad of applications, such as Smart Grid, Smart Cities, home and building automation, etc. Various challenges are presented with LLNs, such as lossy links, low bandwidth, battery operation, low memory and/or processing capability, etc. Large-scale internet protocol (IP) smart object networks pose a number of technical challenges. For instance, the degree of density of such networks (such as Smart Grid networks with a large number of sensors and actuators, smart cities, or advanced metering infrastructure (AMI) networks) may be extremely high. For example, it is not rare for each node to see several hundreds of neighbors. This architecture is particularly problematic for LLNs, where constrained links can wreak havoc on data transmission.

Network deployments utilize a number of different interface technologies, including RF, Powerline Communications (PLC), and cellular. Each interface technology provides its own set of strengths and weaknesses. LLNs communicate over a physical medium that is strongly affected by environmental conditions that change over time. Some examples include temporal changes in interference (for example, other wireless networks or electrical appliances), physical obstruction (for example, doors opening/closing or seasonal changes in foliage density of trees), and propagation characteristics of the physical media (for example, temperature or humidity changes). PLC link technologies, for example, are known to experience significant unpredictable noise that depends on the quality of the electric lines and the kinds of electric devices attached to the network.

Low-cost and low-power designs limit the capabilities of the transceiver. In particular, LLN transceivers typically provide low throughput. Furthermore, LLN transceivers typically support limited link margin, making the effects of interference and environmental changes visible to link and network protocols. Interference may be external (for example, non-network devices generating electromagnetic interference) or internal (for example, other network devices communicating within the same frequency band).

Interface technologies common to LLN deployments (RF and PLC) communicate on shared media. For this reason, communication between different pairs of devices within physical proximity may interfere with each other and is often called self-interference. Note that self-interference can occur in multiple ways in multichannel systems. In one case, two devices transmitting on the same channel simultaneously may cause a collision at the receiver. In another case, because typical interface technologies are half-duplex, a device cannot transmit and receive at the same time even when communication occurs on different channels. As a result, self-interference can occur even when communicating multiple packets along a single path. For example, in a path A→B→C, A cannot forward a packet to B while B is forwarding a packet to C.

Network users would like to have endpoints of the network determine the interface options for all devices on a transmission path and then select interface options for each device to minimize self-interference. Current technologies do not provide the ability to devise a source route for a transmission that will minimize self-interference with network devices.

DESCRIPTION OF EXAMPLE EMBODIMENTS

Overview

Figure 1:
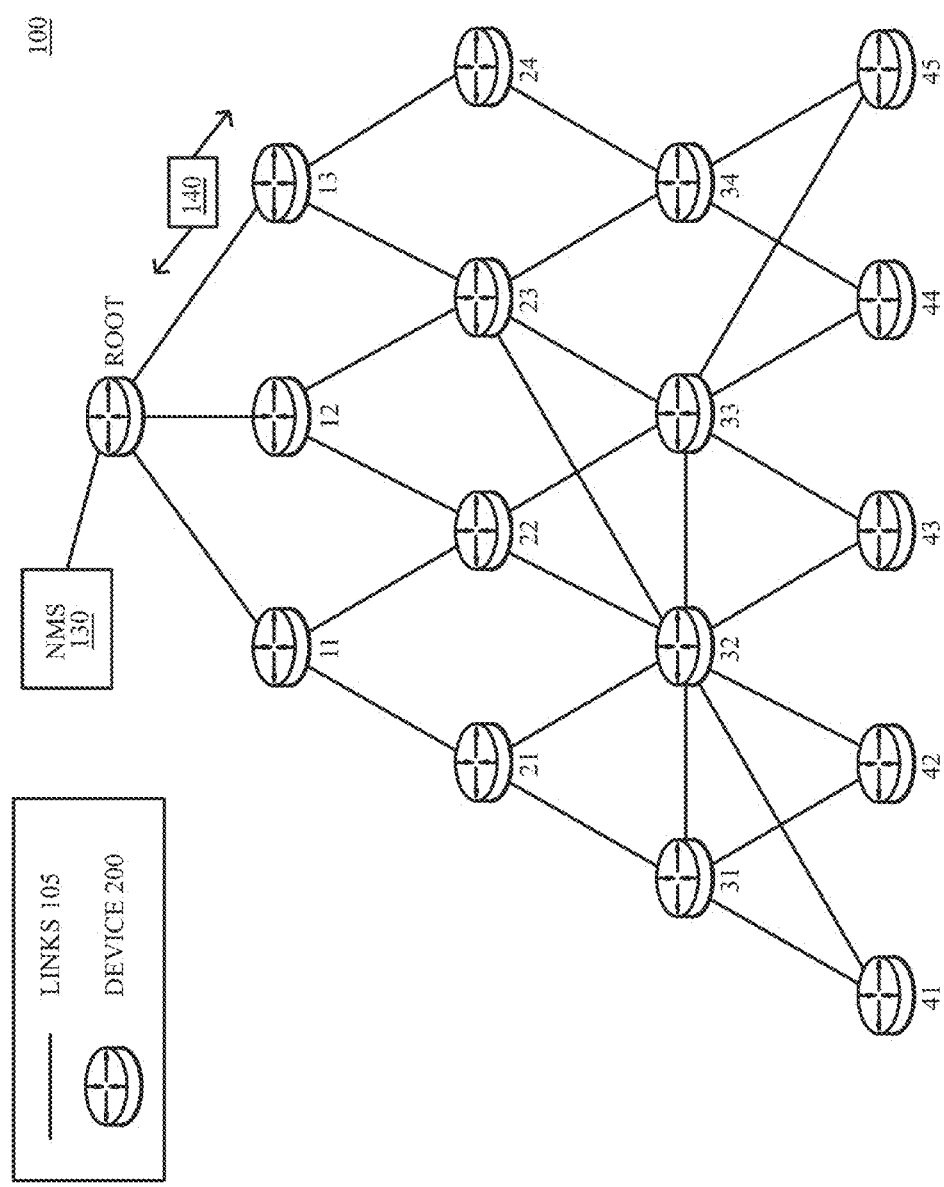
FIG. 1 is a diagram depicting an example communication network in accordance with certain example embodiments.

Techniques herein provide a computer-implemented method to determine communication options for a source route for devices in a network to minimize self-interferences. In a low power and lossy network (LLN) comprising a plurality of nodes and each node in the network comprising one or more communication interfaces, the method comprises determining, by a first node in the network, interface options of the first node and transmitting a request for interface options to each of a plurality of nodes in the network. The first node receives the interface options for at least a portion of the plurality of nodes in the network. When the first node receives a data packet to be sent to a destination node, the first node determines one or more transmission paths from the first node to the destination node, each transmission path comprising a subset of the plurality of nodes in a path from the first node to the destination node. The first node selects a particular interface option for each node in a particular transmission path, the interface option for adjacent nodes in the particular transmission path being selected to minimize interferences between adjacent nodes. The first node identifies the particular transmission path comprising the particular interface option for each node in the particular transmission path, based on a determination that the particular transmission path comprising the particular interface option for each node in the particular transmission path will introduce a least number of interferences compared to one or more other transmission paths, and transmits the particular interface option for each node in the particular transmission path. After the transmission path and interface options are transmitted, the first node transmits the data packet to the destination node via the particular transmission path, wherein each node in the particular transmission path communicates the data packet to a subsequent adjacent node using the particular interface option specified for the transmitting node.

DESCRIPTION

In a multiple interface, low power and lossy network comprising a plurality of devices, communication options for a source route to minimize self-interferences are desired. The ability to request a communication technology for a device to use with neighboring devices allows multiple transmissions to occur simultaneously without interfering with each other. To obtain the transmission path source route for the devices, a root phase device obtains interface option information from the devices in the network paths. In an example embodiment, each device in a network path determines the interface options available, such as powerline communications ("PLC") and radio frequency ("RF"). The device transmits the interface options to the parent device. The parent device transmits the interface options up the network path toward the root phase device. The root phase device collects the interface options and determines transmission routes to any needed endpoint device. The transmission route will comprise the device routes and a communication option for each hop from a parent device to a child device.

Referring to the drawings, in which like numerals represent like (but not necessarily identical) elements throughout the figures, example embodiments are described.

The operations described with respect to any of the FIGS. 1-7 can be implemented as executable code stored on a computer or machine readable non-transitory tangible storage medium (e.g., floppy disk, hard disk, ROM, EEPROM, non-volatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

A computer network is a geographically distributed collection of nodes interconnected by communication links and segments for transporting data between end nodes. Nodes and end nodes include, for example, personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network that is generally considered a self-configuring network of mobile routes (and associated hosts) connected by wireless links, the union of which forms an arbitrary topology.

Smart object networks, such as sensor networks, are a specific type of network having spatially distributed autonomous devices, such as sensors, actuators, etc., that cooperatively monitor physical or environmental conditions at different locations, such as, for example, energy/power consumption, resource consumption (for example, water/gas/ etc. for advanced metering infrastructure or "AMI" applications), temperature, pressure, vibration, sound, radiation, motion, pollutants, etc. Other types of smart objects include actuators, for example, responsible for turning on/off an engine or performing any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port (such as PLC), a microcontroller, and an energy source (such as a battery). Often, smart object networks are considered field area networks (FANs), neighborhood area networks (NANs), etc. Generally, size and cost constraints on smart object nodes (for example, sensors) result in corresponding constraints on resources, such as energy, memory, computational speed, and bandwidth.

Mesh networks have become increasingly popular and practical in recent years. In particular, shared-media mesh networks, such as wireless or PLC networks, etc., are often on what is referred to as Low Power and Lossy Networks (LLNs). LLNs are a class of network in which both the routers and their interconnects are constrained: LLN routers typically operate with constraints (for example, processing power, memory, and/or energy (battery)), and their interconnects are characterized by, illustratively, high loss rates, low data rates, and/or instability. LLNs are comprised of anything from a few dozen or up to thousands or even millions of LLN routers. Additionally, LLN's support point-to-point traffic (between devices inside the LLN), point-to-multipoint traffic (from a central control point, such as the root node, to a subset of devices inside the LLN), and multipoint-to-point traffic (from devices inside the LLN towards a central control point).

Loosely, the term "Internet of Things" or "IoT" may be used by those in the network field to refer to uniquely identifiable objects (things) and their virtual representations in a network-based architecture. In particular, the next frontier in the evolution of the Internet is the ability to connect more than just computers and communications devices, but also the ability to connect "objects" in general, such as lights, appliances, vehicles, HVAC (heating, ventilating, and air-conditioning), windows, window shades, and blinds, doors, locks, etc. The "Internet of Things" thus generally refers to the interconnection of objects (for example, smart objects), such as sensors and actuators, over a computer network (for example, internet protocol ("IP")), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, building and industrial automation, and cars (for example, that can interconnect millions of objects for sensing things like power quality, tire pressure, and temperature, and that can actuate engines and lights), it has been of the utmost importance to extend the IP protocol suite for these networks.

FIG. 1 is a schematic block diagram of an example computer network 100 illustratively comprising nodes/devices 200 (for example, labeled as shown, "root," "11," "12," . . . "45," and described in FIG. 2 below) interconnected by various methods of communication. For instance, the links 105 may be wired links or shared media (for example, wireless links, PLC links, etc.) where certain nodes 200 (such as, for example, routers, sensors, computers, etc.) may be in communication with other nodes 200, for example, based on distance, signal strength, current operational status, location, etc. Those skilled in the art will understand that any number of nodes, devices, links, etc. may be used in the computer network 100 and that the view illustrated herein is for simplicity. Also, those skilled in the art will further understand that while the network 100 is shown in a certain orientation, particularly with a "root" node, the network 100 is merely an example illustration that is not meant to limit the disclosure. In addition, a network management server (NMS) 130, or other head-end application device located beyond the root device (for example, via a WAN), may also be in communication with the network 100.

Data packets 140 (for example, traffic and/or messages sent between the devices/nodes) may be exchanged among the nodes/devices of the computer network 100 using predefined network communication protocols, such as certain known wired protocols, wireless protocols (for example, IEEE Std. 0.15.15.4, WiFi, Bluetooth®, etc.), PLC protocols, or other shared-media protocols where appropriate. In this context, a protocol comprises of a set of rules defining how the nodes interact with each other.

Figure 2:
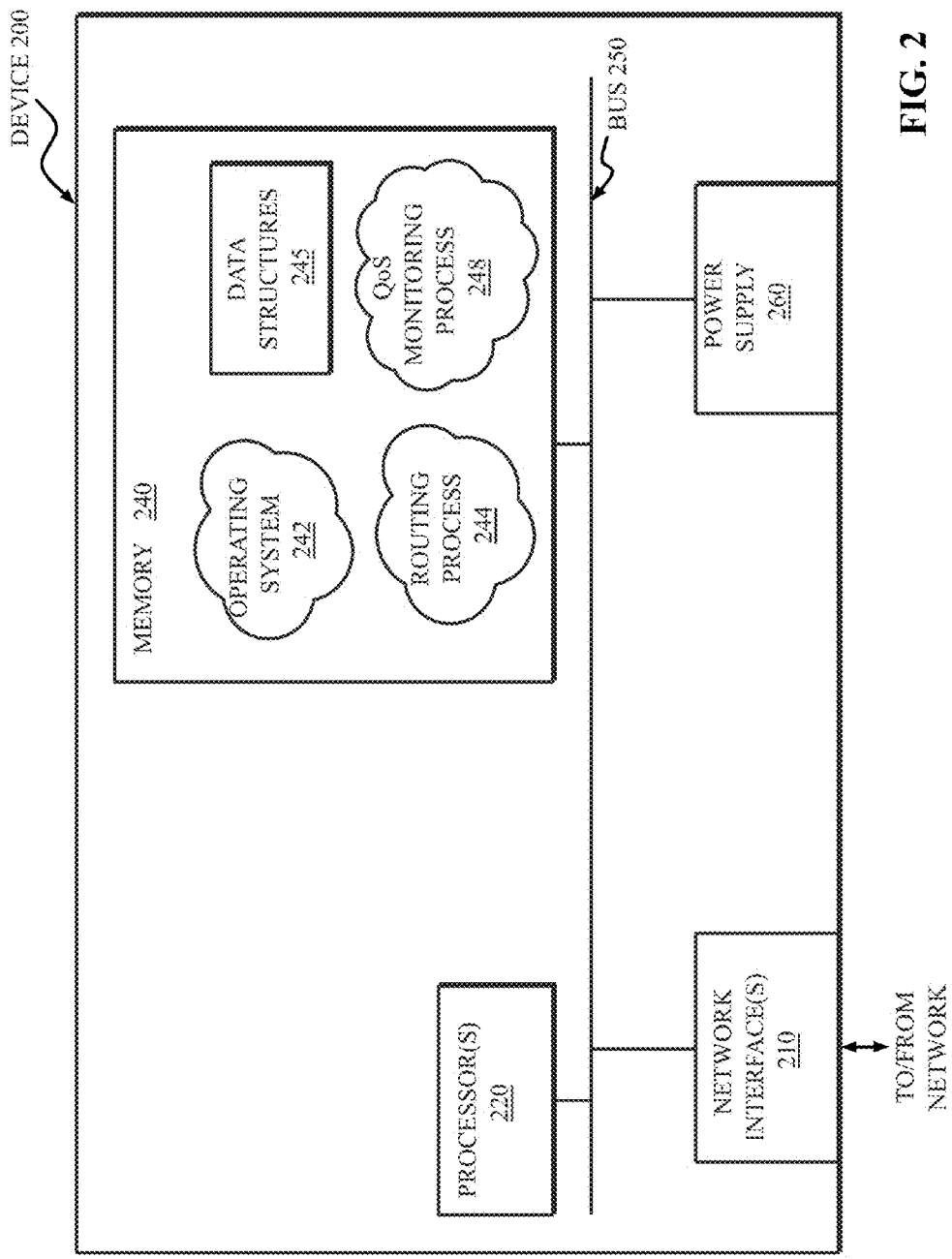
FIG. 2 is a block diagram depicting an example network device/node in accordance with certain example embodiments.

FIG. 2 is a schematic block diagram of an example node/device 200 that may be used with one or more embodiments described herein, for example, as any of the nodes shown in FIG. 1 above. The device 200 may comprise one or more network interfaces 210 (for example, wired, wireless, PLC, etc.), at least one processor 220, and a memory 240 interconnected by a system bus 250, as well as a power supply 260 (for example, battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes 200 may have multiple types of network connections, for example, wireless and wired/physical connections, and that the view depicted herein is merely for illustration. Also, while the network interface 210 is shown separately from the power supply 260, the network interface 210 may communicate through the power supply 260 or may be an integral component of the power supply, for example, for PLC. In some specific configurations, the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (for example, no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor 220, functionally organizes the device by, inter alia, invoking operations in support of software processes and/or services executing on the device. These software processes and/or services may comprise routing process/services 244 and an illustrative "QoS monitoring" process 248, as described herein. Note that while QoS monitoring process 248 is shown in centralized memory 240, alternative embodiments provide for the process to be specifically operated within the network interfaces 210, such as a component of a network layer operation within the network interfaces 210 (as process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (for example, according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, for example, data used to make routing/forwarding decisions. In particular, in proactive routing, connectivity is discovered and known prior to computing routes to any destination in the network, for example, using link state routing such as Open Shortest Path First (OSPF), Intermediate-System-to-Intermediate-System (ISIS), or Optimized Link State Routing (OLSR). Reactive routing, on the other hand, discovers neighbors (in other words, it does not have an a priori knowledge of network topology) and, in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), Dynamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), for example, certain sensor networks, may be used in a myriad of applications, such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, for example, considerably affecting bit error rate (BER);
2) Links are generally low bandwidth, such that control plane traffic must generally be bounded and negligible compared to the low rate data traffic;
3) A number of use cases require specifying a set of link and node metrics, some of them being dynamic, thus requiring specific smoothing functions to avoid routing instability, which considerably drains bandwidth and energy;
4) Constraint-routing may be required by some applications, for example, to establish routing paths that will avoid non-encrypted links, nodes running low on energy, etc.;
5) Scale of the networks may become very large, for example, on the order of several thousands to millions of nodes; and
6) Nodes may be constrained with low memory, a reduced processing capability, a low power supply (for example, battery), etc.

An example implementation of LLNs is an "Internet of Things" network. As described above, the term "Internet of Things" or "IoT" may be used by those in the art to refer to uniquely identifiable objects (things) and their virtual representations in a network-based architecture.

One example protocol is specified in Internet Engineering Task Force (IETF) Proposed Standard, Request for Comment (RFC) 6550, entitled "RPL: IPv6 Routing Protocol for Low Power and Lossy Networks" by Winter, et al. (March 2012). This protocol provides a mechanism that supports multipoint-to-point (MP2P) traffic from devices inside the LLN towards a central control point (for example, LLN Border Routers (LBRs) or "root nodes/devices" generally), as well as point-to-multipoint (P2MP) traffic from the central control point to the devices inside the LLN (and also point-to-point or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (for example, "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, in other words, at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (for example, the farther away a node is from a root, the higher the rank of that node). Further, in certain embodiments, a sibling of a node within a DAG may be defined as any neighboring node that is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (for example, by a DAG process) based on an Objective Function (OF). The role of the objective function is generally to specify rules on how to build the DAG (for example, number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. Alternatively, the constraints and metrics may be separated from the objective function. Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc. are considered "DAG parameters."

Illustratively, example metrics used to select paths (for example, preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (for example, wired, wireless, etc.), etc. The objective function may provide rules defining the load balancing requirements, such as a number of selected parents (for example, single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example objective function (for example, a default objective function) may be found in an IETF RFC, entitled "RPL Objective Function 0"<RFC 6552> by Thubert (March 2012 version) and "The Minimum Rank Objective Function with Hysteresis"<RFC 6719> by O. Gnawali et al. (September 2012 version).

Building a DAG may utilize a discovery mechanism to build a logical representation of the network and a route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, for example, following the orientation of the edges within the DAG. Conversely, "downward" or "down" paths are routes that lead in the direction from DAG roots towards leaf nodes, for example, generally going in the opposite direction to the upward messages within the DAG.

Generally, a DAG discovery request (for example, DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (for example, DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
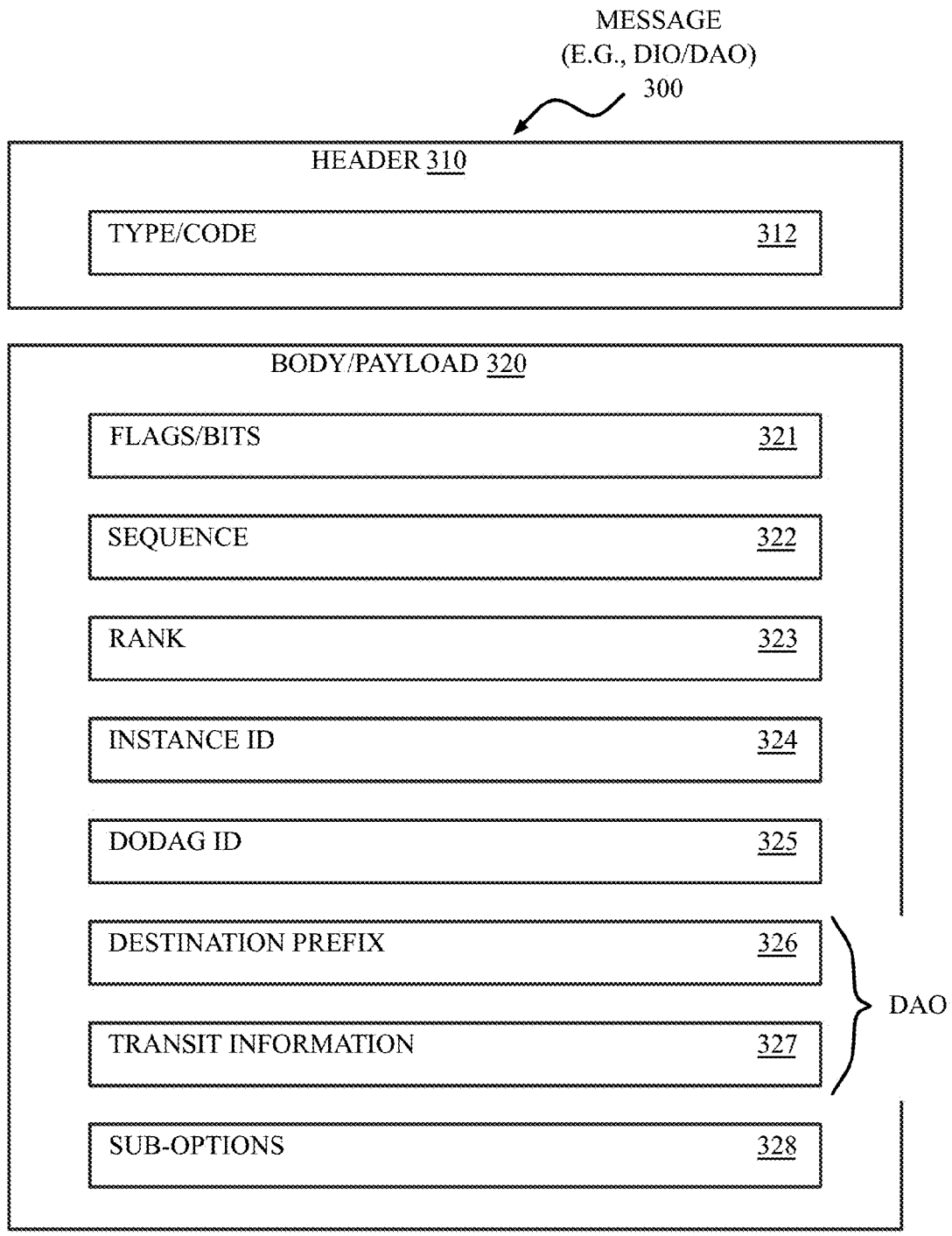
FIG. 3 is a block diagram depicting a packet header and payload organization in accordance with certain example embodiments.

FIG. 3 illustrates an example simplified control message format 300 that may be used for discovery and route dissemination when building a DAG, for example, as a DIO, DAO, or DIS message. Message 300 illustratively comprises a header 310 with one or more fields 312 that identify the type of message (for example, a RPL control message) and a specific code indicating the specific type of message, for example, a DIO, DAO, or DIS. Within the body/payload 320 of the message may be a plurality of fields used to relay pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (for example, DAO_Sequence used for acknowledgements (ACKs), etc.). For any type of message 300, one or more additional sub-option fields 328 may be used to supply additional or custom information within the message 300. For instance, an objective code point (OCP) sub-option field may be used within a DIO to carry codes specifying a particular objective function to be used for building the associated DAG. Alternatively, sub-option fields 328 may be used to carry other information within a message 300, such as indications, requests, capabilities, lists, notifications, etc., for example, in one or more type-length-value (TLV) fields.

Figure 4:
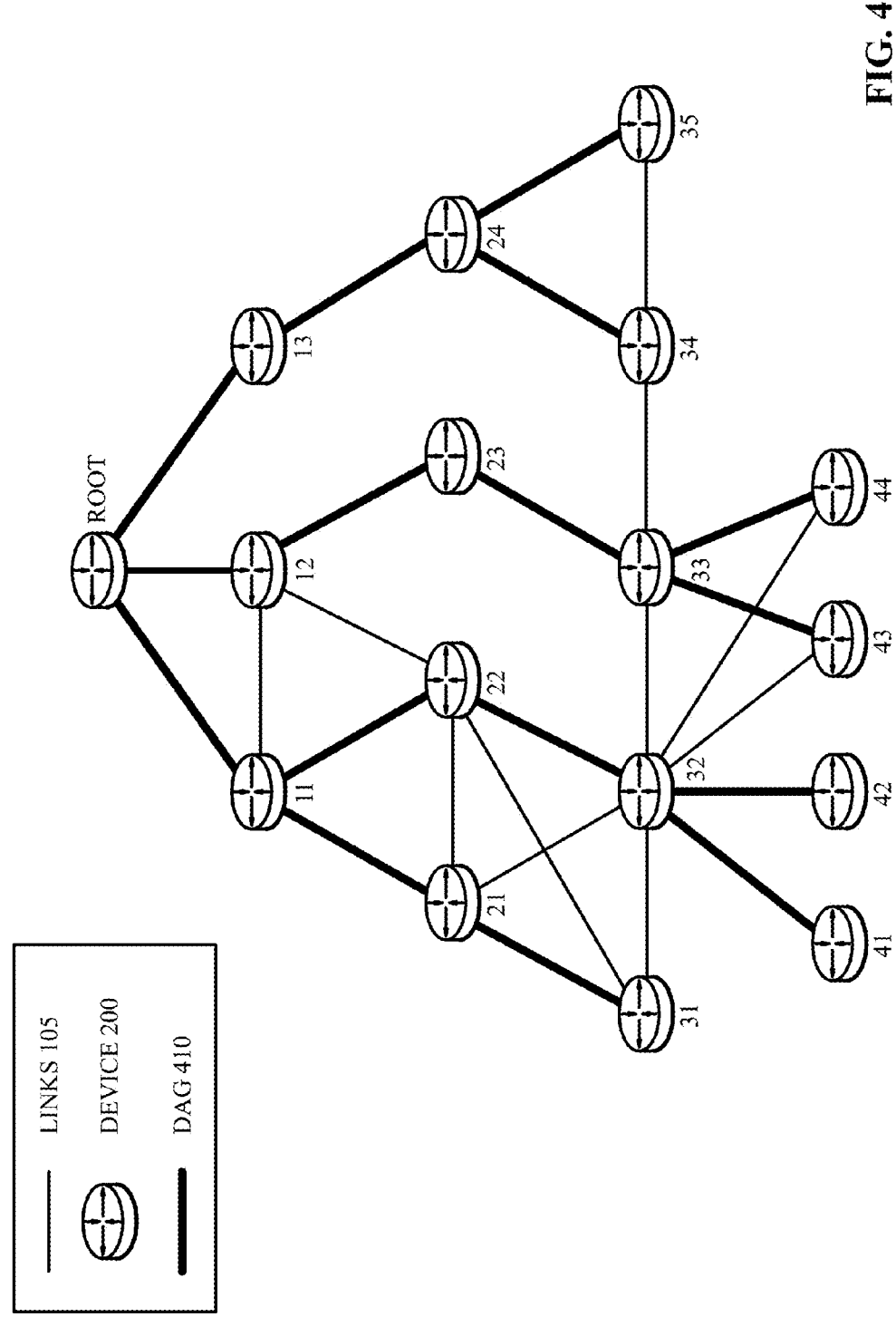
FIG. 4 is a diagram depicting a directed acyclic graph defined within a computer network in accordance with certain example embodiments.

FIG. 4 illustrates an example simplified DAG that may be created, for example, through the techniques described above, within the network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein. Note that although certain examples described herein relate to DAGs, the embodiments of the disclosure are not so limited and may be based on any suitable routing topology, particularly for constrained networks.

As noted above, shared-media communication networks, such as wireless and power-line communication (PLC) networks (a type of communication over power-lines), provide an enabling technology for networking communication and can be used for example in Advanced Metering Infrastructure (AMI) networks, and are also useful within homes and buildings. Interestingly, PLC lines share many characteristics with low power radio (wireless) technologies. In particular, though each device in a given PLC network may be connected to the same physical power-line, due to their noisy environment, a PLC link provides limited range and connectivity is highly unpredictable, thus requiring multi-hop routing when the signal is too weak. For instance, the far-reaching physical media exhibits a harsh noisy environment due to electrical distribution transformers, commercial and residential electric appliances, and cross-talk effects. As an example, even within a building, the average number of hops may be between two and three (even larger when having cross phases), while on an AMI network on the same power phase line the number of hops may vary during a day between one and 15-20. Those skilled in the art would thus recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

Furthermore, such communication links are usually shared (for example, by using wireless mesh or PLC networks) and provide a very limited capacity (for example, from a few Kbits/s to a few dozen Kbits/s). LLN link technologies typically communicate over a physical medium that is strongly affected by environmental conditions that change over time. For example, LLN link technologies may include temporal changes in interference (for example, other wireless networks or electric appliances), spatial/physical obstruction (for example, doors opening/closing or seasonal changes in foliage density of trees), and/or propagation characteristics of the physical media (for example, changes in temperature, humidity, etc.). The timescale of such temporal changes may range from milliseconds (for example, transmissions from other wireless networks) to months (for example, seasonal changes of outdoor environment). For example, with a PLC link the far-reaching physical media typically exhibits a harsh noisy environment due to a variety of sources including, for example, electrical distribution transformers, commercial and residential electric appliances, and cross-talk effects. Real world testing suggests that PLC link technologies may be subject to high instability. For example, testing suggests that the number of hops required to reach a destination may vary between 1 and 17 hops during the course of a day, with almost no predictability. It has been observed that RF and PLC links are prone to a number of failures, and it is not unusual to see extremely high Bit Error Rates (BER) with packet loss that may be as high as 50-60%, coupled with intermittent connectivity.

As further noted above, many LLNs, particularly AMI networks, demand that many different applications operate over the network. For example, the following list of applications may operate simultaneously over AMI networks:

is 1) Automated Meter Reading that involves periodically retrieving meter readings from each individual meter to a head-end server;
2) Firmware upgrades, for example, that involve communicating relatively large firmware images (often 500 KB or more) from a head-end server to one device, multiple devices, or all devices in the network;
3) Retrieving load curves;
4) Real-time alarms generated by meters (for example, power outage events) that actually act as sensors;
5) Periodically retrieving network management information from each meter to a Network Management System (NMS) 130;
6) Supporting demand response applications by sending multicast messages from a head-end device to large numbers of meters;
7) Etc.

One of skill in the art will appreciate that the above-enumerated examples are similar for other types of LLNs.

Generally speaking, these different applications have significantly different traffic characteristics, for example, unicast vs. multicast, small units of data vs. large units of data, low-latency vs. latency-tolerant, flows toward a head-end vs. away from the head-end, etc. Furthermore, since these applications must operate simultaneously over a highly constrained LLN network, the network can easily experience congestion, especially when different applications are sending traffic simultaneously. For example, the bandwidth of LLN links may be as low as a few Kbits/s, and even lower when crossing transformers (for PLC). Without proper mechanisms, these situations can cause networks to violate critical service layer agreements (SLAs), for example, delaying the reception of critical alarms from a meter. Accordingly, Quality of Service (QoS) mechanisms are a critical functionality in shared-media communication networks, particularly in highly constrained LLNs.

Numerous QoS mechanisms have been developed for "classic" IP networks (unconstrained), including: (1) packet coloring and classification (for example, by applications or Edge network entry points), (2) congestion avoidance algorithms with random drops for back-pressure on Transmission Control Protocol (TCP) (for example, WRED, etc.), (3) queuing techniques (for example, preemptive queuing+round robin+dynamic priorities), (4) bandwidth reservation (for example, Diffsery (by CoS), Intsery (RSVP(-TE), etc.), (5) Input/Output shaping (for example, congestion-based traffic shaping), (6) Call Admission Control (CAC) using protocols such as the Resource reSerVation Protocol (RSVP) and/or input traffic shapers, (7) Traffic Engineering, and (8) Congestion Avoidance techniques, etc. However, while some of these techniques may apply to LLNs, most are not suitable because they are too costly in terms of bandwidth (control plane overhead), memory (state maintenance), and/or CPU processing. Indeed, policies must be specified for packet coloring, and queuing techniques and congestion avoidance algorithms, such as WRED, must be configured on nodes. Such algorithms require a deep knowledge of traffic patterns, link layer characteristics, and node resources with respect to a number of parameters to configure each individual device.

Figure 5:
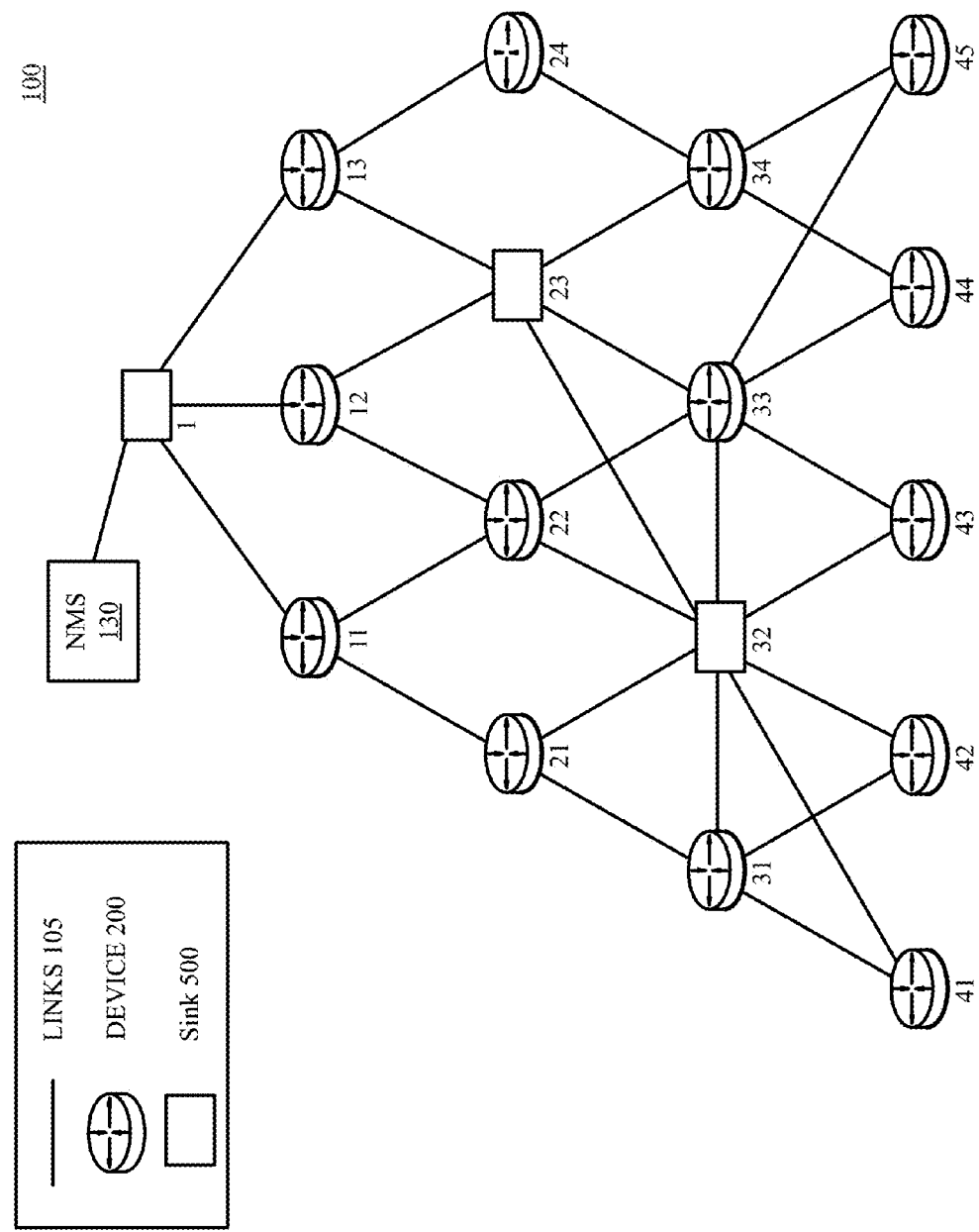
FIG. 5 is a block diagram depicting an example communication network in accordance with certain alternative example embodiments.

Although the techniques described herein are illustrated with respect to an LLN in which network traffic transits through the root/LBR, it should be noted that the techniques described herein may be generally applied to any network, particularly to any constrained network. For example, as shown in FIG. 5, a network 100 that does not have a central node through which all traffic is piped (for example, like the LBR of an LLN), may have one or more sinks 500 that reside at strategic locations throughout the network (for example, nodes 1, 23, and 32) to ensure that all potential traffic within the network may be monitored and routed according to the techniques described herein. In such an environment, the sinks may operate independently or in collaboration (for example, with each other or with an NMS) to perform the techniques described herein.

The techniques described herein may be performed by hardware, software, and/or firmware, such as in accordance with the "QoS monitoring" process 248/248a shown in FIG. 2, which may contain computer executable instructions executed by the processor 220 (or independent processor of interfaces 210) to perform functions relating to the techniques described herein, for example, in conjunction with routing process 244. For example, the techniques herein may be treated as extensions to conventional protocols, such as the various PLC protocols or wireless communication protocols, and as such, may be processed by similar components understood in the art that execute those protocols.

Dynamic Source Route Computation to Avoid Self-Interference

Low-power and Lossy Networks (LLNs) communicate using low data rate links, such as IEEE 802.15.4 for RF and P1901.2 for PLC. LLNs face a number of communication challenges. First, LLNs communicate over a physical medium that is strongly affected by environmental conditions that change over time. Some examples include temporal changes in interference (such as, other wireless networks or electrical appliances), physical obstruction (such as, doors opening/closing or seasonal changes in foliage density of trees), and propagation characteristics of the physical media (such as, temperature or humidity changes). The time scales of such temporal changes can range between milliseconds (such as, transmissions from other transceivers) to months (such as, seasonal changes of outdoor environment).

Additionally, low-cost and low-power designs limit the capabilities of the transceiver. In particular, LLN transceivers typically provide low throughput. Furthermore, LLN transceivers typically support limited link margin, making the effects of interference and environmental changes visible to link and network protocols. Interference may external (non-network devices generating electromagnetic interference) or internal (other network devices communicating within the same frequency band).

Smart Grid AMI deployments utilize a number of different link technologies, including RF, PLC, and cellular. Each link technology provides a set of strengths and weaknesses; however, a common recurring characteristic is that a single technology is only capable of reaching 95-98% of devices. Existing partners and customers have indicated that reaching the last 3-5% of devices can incur nearly half the operating cost. The problem today is that Smart Grid AMI vendors currently model which single technology provides the best coverage, then attempt to patch the rest with other technologies. In many cases, the modeling is inaccurate and the wrong link technology may be chosen for a given device. A service call to replace a single device can often exceed the cost of the meter itself.

An alternative approach is to have Smart Grid AMI devices support multiple link technologies simultaneously, such as RF and PLC. A multi-interface solution allows networks operators to address numerous technical issues and make a number of technology improvements. Furthermore, while this multi-interface solution increases the overall BoM cost, significant cost savings are made by minimizing service calls needed when a single-interface solution fails.

Link technologies common to LLN deployments (RF and PLC) communicate on shared media. For this reason, communication between different pairs of devices within physical proximity may interfere with each other and is often called self-interference. Self-interference can occur in a couple ways in multichannel systems. In one case, two devices transmitting on the same channel simultaneously cause a collision at the receiver. In another case, because typical link technologies are half-duplex, a device cannot transmit and receive at the same time even when communication occurs on different channels. As a result, self-interference can occur even when communicating multiple packets along a single path. For example, in a path A→B→C, A cannot forward a packet to B while B is forwarding a packet to C.

The goal of this method is to dynamically form source routes that minimize self-interference. In particular, this method minimizes self interference when forwarding messages along a single path. Minimizing self-interference serves to increase robustness, reduce latency, reduce channel utilization, and improve overall network performance.

The disclosed embodiments dynamically generate source routes that minimize self-interference. In particular, the methods aims to minimize self-interference caused by the half-duplex nature of the link technologies commonly used in low-power and lossy networks ("LLNs"). Examples of link technologies are radio frequency ("RF"), power line communications ("PLC"), and cellular. For example, in a path A→B→C, A cannot forward a packet to B while B is forwarding a packet to C. Furthermore, the embodiments aim to minimize self-interference caused by the hidden terminal problem. As an example of a hidden terminal problem, in a path A→B→C→D, A cannot forward a packet to B while C is forwarding a packet to D. The transmissions from A and C would collide at B. Note that this type of issue is a strong limiting factor for LLN performance and a severe issue to bound delays when sending a train of packets.

A first embodiment includes augmenting the routing topology information with the different link technologies in use. In particular, devices annotate each routing adjacency with the set of logical links that may be used to communicate a message. In the simplest case, the communication may involve having a single Boolean flag that indicates whether or not RF or PLC is available for use. Using link quality evaluation techniques, a device may determine whether or not it can communicate with a neighboring device using RF and/or PLC. A more sophisticated method may involve providing a link quality metric for each available device rather than a single Boolean flag.

For example, a device may provide the Expected Transmission Count (ETX) or Expected Transmission Overhead (ETO) for each available communication interface available for the device. For some communication interfaces, multiple logical channels may be created. For example, the channels may use different frequencies or subcarriers. In this case, the information may also include the identifications of which channels or subcarriers are available for transmitting. When using the RPL protocol, this additional information may be encoded in the DAO message used to provide the DAG Root with routing topology information.

A second embodiment includes having the source route include the device parameters used at each hop in addition to specifying each node along the path. In one embodiment, the communication may be included as an additional field along with the IPv6 Address in an IPv6 Routing Header. Nodes processing the IPv6 Routing Header determine the next hop destination and the device layer parameters to use when forwarding the message to the next hop.

A third embodiment includes generating source routes that minimize self-interference between two adjacent links along a single path. As noted above, self-interference occurs when two adjacent links attempt to utilize the same device interface when forwarding a message. Because typical LLN link technologies are half-duplex, a device cannot receive and transmit simultaneously using the same physical interface. In one embodiment, only source routes that do not use the same communication option between adjacent nodes along the path may be used. That is, a node N(k) along a path must not utilize the same communication option as N(k+1) for all valid values of k and k+1.

In the case of an RF and PLC system, this embodiment may involve alternating between using RF and PLC for each hop on the path. In some cases, a path that satisfies this constraint may not exist. As a result, in another embodiment, a metric may be used to quantify the amount of self-interference. One metric may be the number of adjacent links that utilize the same communication option. Then the goal is to find a path that minimizes the self-interference metric. In certain embodiments, the method may be subject to additional constraints or metrics, such as path ETX or path latency. This method is in contrast with all existing routing techniques that select the shortest (constrained) path. By taking into account the self-interference problem, especially in an environment using multiple communication options, collisions are reduced and, consequently, over path delays are improved.

A fourth embodiment includes generating source routes that minimize self-interference between two links separated by a single link. As noted above, this self-interference is caused by the hidden-terminal problem.

In the example of A→B→C→D, A and C cannot transmit using the same logical channel without colliding at B. Note, however, that cases exist where A and C can transmit at the same time. This case is in contrast to the previous component where the same physical interface cannot transmit and receive at the same time. For example, when A and C are using RF to transmit, as long as they are transmitting on different channels, then a collision will not occur at B. With a pseudo-random channel-hopping sequence, the chance for collision is relatively low. In other cases, collisions may be perfectly acceptable (for example, when using network coding techniques to demodulate multiple signals simultaneously). In cases where the transmitter can specify what channel or subcarriers on which to transmit (for example, IEEE P1901.2), collisions can be avoided by ensuring that A and C do not transmit on the same set of channels/subcarriers. As a result, when generating a source route, the goal is to find a path that minimizes the number of collisions caused by hidden-terminal.

A fifth component is directed to the feedback loop between the computing agent and the policy engine in charge of enforcing SLAs. Typically, the computing agent is a field area router ("FAR") that generated the source route avoiding self-interference, or, more generally a node in the network. The policy engine is typically hosted on the NMS. In some cases, the new (constrained) path that avoids self-interference may be more expensive according to certain metrics, such as ETX. Should the new computed path delay be larger by x % compared to the shortest path (ignoring self-interference), the node may notify the policy engine of the increased delay to validate the new path. Alternatively, SLAs may be downloaded on the node computing the source route path. Even if the path may sometimes be more expensive, the path will in reality lead to dramatically shorter delays thanks to the property of avoiding collisions.

A sixth embodiment includes specifying a novel IPv6 hop-by-hop header used to record the number of times a packet suffered from collision because of self-interference. The devices may report the number of collisions for a train of packets to the source node (for example, the FAR). If a path suffers from significant self-interference, the source node may start enforcing a specified routed path to avoid such self-interference. Such a mechanism would then allow for dynamic enforcement of self-interference avoidance source-routed paths only for flows that experience such an issue.

Figure 6:
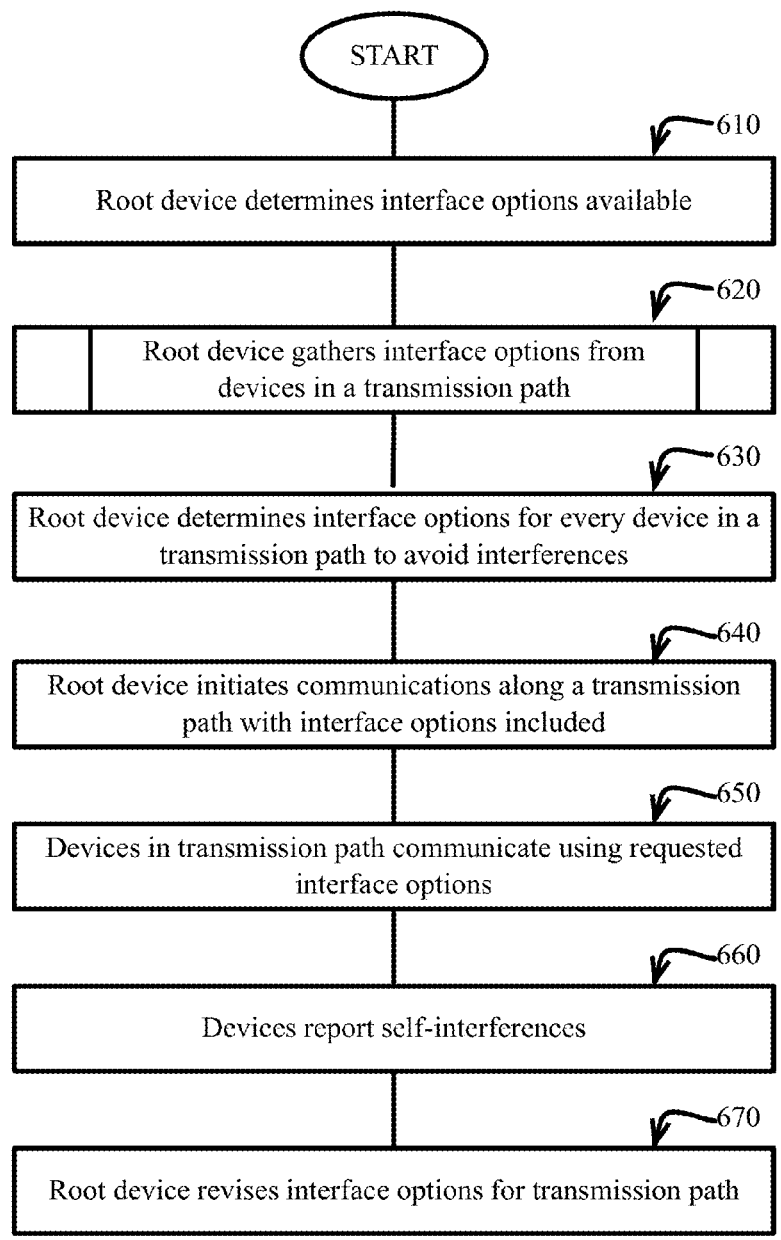
FIG. 6 is a block flow diagram depicting a method to determine interface options for a source route to minimize self-interferences in accordance with certain example embodiments.

FIG. 6 is a block flow diagram depicting a method 600 to determine interface options for a source route to minimize self-interferences, in accordance with certain example embodiments. The method 600 is described with reference to the components illustrated in FIGS. 1-5.

In block 610, a root device 200a determines interface options available on the root device 200a. The root device 200a may be a field area router ("FAR"), network management system ("NMS"), or other central device or source node with the processing capabilities to perform the steps disclosed herein. The root device 200a may be provided with interface options such as RF, PLC, cellular, or any suitable interface. The root device 200a determine aspects of each available interface. For example, the root device 200a may determine the number of available RF channels, a tone map for the PLC interface, or any suitable aspects of each available interface. In an example embodiment, the root device 200a can read the available interface information from its preconfigured memory or from the hardware components available in the root device 200a.

In block 620, the root device 200a gathers interface options from devices 200 in a transmission path in the network. Block 620 is discussed in greater detail hereinafter with reference to FIG. 7.

Figure 7:
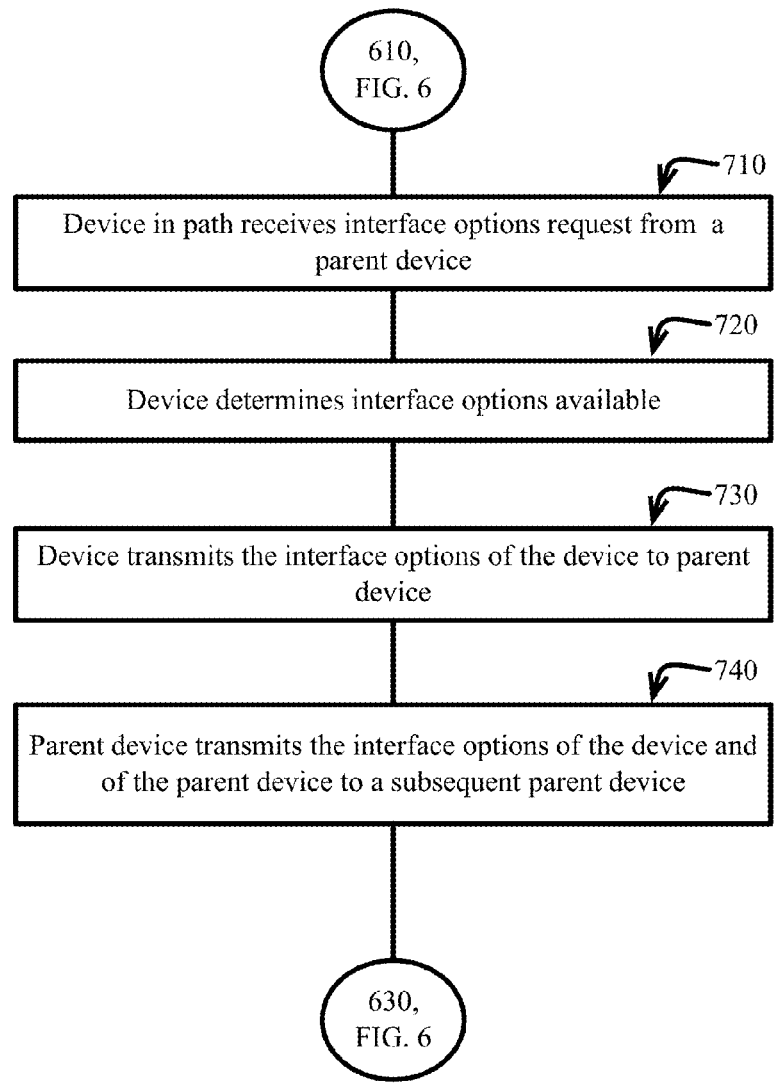
FIG. 7 is a block flow diagram depicting a method to gather interface options from devices in transmission path in accordance with certain example embodiments.

FIG. 7 is a block flow diagram depicting a method 620 to gather communication options from devices in a transmission path in a network, in accordance with certain example embodiments. The method 620 is described with reference to the components illustrated in FIGS. 1-5.

In block 710, a device 200c in the network receives an interface option request from a parent device 200b. The parent device 200b may be a root device 200a or any device 200 in one or more transmission paths. The request may be transmitted through any number of devices 200 in a transmission path until reaching the parent device 200b. The parent device 200b transmits the request to the device 200c. The interface option request may be received as a separate data object with a data packet, in a separate layer, as an information element, or in any suitable manner. In alternative embodiments, a device 200c may transmit its interface options periodically to the parent device 200b rather than on request. Such transmission may be on a configured schedule, such as after a configured period of time or after a certain number of data packet transmissions.

In block 720, the device 200c determines interface options available on the device 200. The device 200c may be provided with interface options such as RF, PLC, cellular, or any suitable interface. The device 200c determines aspects of each interface. For example, the device 200c may determine the number of available RF channels, a tone map for the PLC interface, or any suitable aspects of each interface. In an example embodiment, the device 200c can read the available interface information from its preconfigured memory or from the hardware components available in the device 200c.

In block 730, the device 200c transmits the interface options of the device 200c to the parent device 200b or to any suitable device 200. The interface options may be transmitted as a separate data object with a data packet, in a separate layer, or in any suitable manner. The interface options may comprise an identification of the device 200c, the neighbor devices 200 of the device 200c, the interface options available on the device 200c, and any other suitable information. In certain embodiments, the device 200c transmits the interface options directly to the root device 200a or any other suitable device 200.

In block 740, the parent device 200b (or other neighbor device 200) transmits the interface options of the device 200c and of the parent device 200b to a subsequent parent device 200d. That is, each device 200 that is a parent device 200b to another device 200c, transmits all of the interface options to a subsequent parent device 200d until the data reaches the root device 200a.

From block 740, the method 620 proceeds to block 630 in FIG. 6.

Returning to FIG. 6, in block 630, the root device 200a determines interface options for every device 200 in a transmission path to avoid interferences. The root device 200a analyzes the interface options of the devices 200 to determine preferred routes of the transmission paths.

The root device 200a may build a tree, or other suitable graph, of the available transmission paths. For example, the root device 200a may determine any potential destination for a data packet and identify multiple routes that may be taken to deliver the packet to the destination. Each route may comprise a series of hops between a number of devices 200. Each device 200 receives the packet and transmits the packet to one or more other devices 200.

For an example transmission path, the root device 200a identifies the interface data from each of the devices 200 in the path. Based on the interface options known by the root device 200a, the root device 200a derives a series of interface selections to minimize self-interferences.

In an example, the root device 200a provides instructions to the first device 200b in the path to transmit to the second device 200c in the path using channel 1 of the RF interface. The instructions from the root device 200a, when received by the second device 200b in the path, instruct the second device 200b in the path to transmit to the third device 200c in the path using the low range of a PLC tone map. The instructions from the root device 200a, when received by the third device 200c in the path, instruct the third device 200c in the path to transmit to the fourth device 200f in the path using the channel 10 of the RF interface. The instructions from the root device 200a specify each device 200 in the path and the interface option for each particular device 200 to communicate with the next device 200 in the path. In this manner, the devices 200 may continue to transmit data without interfering with each other. Additionally, the devices 200 may transmit on one interface while receiving on a second interface. Many devices are unable to transmit and receive simultaneously on the same interface, and the root device 200a may attempt to alleviate this issue by configuring devices 200 to send and receive via different interfaces.

In certain embodiments, more than one transmission path may be possible to reach the destination device. In an example, one of the paths is shorter than a second path. That is, one of the paths must hop through a smaller number of devices 200 than a second path. The root device 200a may have instructions to always select the shortest path. The root device 200a configures the interface options for the devices 200 in the shortest path. However, the root device 200a may be configured to select a path that may be more costly, but has less self-interferences. For example, a certain path may employ three more device 200 hops than the shortest route to a destination. However, the longer route may have more interface options, better interface options, or in any manner have device interface options that allow less self-interferences. The root device 200a may select the longer path to transmit data to the destination.

In block 640, the root device 200a initiates communications along a transmission path with interface options included. The root device 200a may have a data packet that is intended for a destination device 200d. The root device 200a selects the desired transmission path to the destination device 200d. The root device 200a transmits the data packet to the first device 200b in the path. The interface options for the devices 200 in the transmission path may be transmitted as a separate data object with a data packet, in a separate layer, as an information element, or in any suitable manner.

In block 650, the devices 200 in the transmission path communicate using the requested interface options. Each device 200 receives the data packet and the interface options. Each device 200 determines the interface option that should be used to transmit the data packet to the next device 200 based on the interface option specified for that device 200 and then uses the specified interface option to transmit the data packet to the next device 200 in the path.

In block 660, a device 200 reports self-interferences. A device 200 may have interferences from neighbor devices 200n. The neighbor device 200n may be in the transmission path of the device 200 or in a different transmission path. The device 200 logs the interference and transits the interference with future transmissions. Each device 200 passes the report to the next device 200 until the report reaches the root device 200a.

In block 670, the root device 200a revises interface options for transmission paths based at least in part on the received reports. That is, when interferences are reported for the current transmission paths and interface options, the root device 200a determines if revisions to the transmission paths and interface options should be made to reduce the interferences. The new transmission path may be longer, but the reduced interferences may make the new path faster or more efficient. If the root device 200a changes the path or interface options, the new instructions are communicated to the devices 200 for use in subsequent communications.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, an ordinarily skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be repeated, performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structure.

What is claimed is:

1. A method, comprising:
   receiving, by a first node in a network comprising a plurality of nodes, a data packet, the data packet identifying a destination node in the network to which the data packet is to be sent, each of the plurality of nodes comprising at least two communication interfaces, wherein the communication interfaces comprise at least one of a power line communication ("PLC") interface and a radio frequency ("RF") interface;
   selecting, by the first node, a particular transmission path from the first node to the destination node, based on a determination that the selected transmission path will introduce a least number of interferences compared to one or more other transmission paths, each transmission path comprising either a PLC interface option or an RF interface option for each of at least one node between the first node and the destination node;
   indicating, by the first node to each node in the selected transmission path, the particular interface option for that node in the particular transmission path;
   transmitting, by the first node, the data packet to the second node via the particular transmission path using one of the selected PLC interface or the selected RF interface;
   transmitting, by the second node, the data packet to a third node via the particular transmission path using one of the selected PLC interface or the selected RF interface and not the same communication interface as transmitted by the first node.

2. The method of claim 1, further comprising:
   determining, by a first node in the network, interface options of the first node; and
   transmitting, by the first node, a request for interface options to each of a plurality of nodes in the network.

3. The method of claim 2, wherein transmitting, by the first node, a request for interface options to each of a plurality of nodes in the network comprises transmitting the request to one or more adjacent nodes which then transmit the request to one or more subsequent adjacent nodes, and wherein each subsequent node receiving the request transmits the request to subsequent adjacent nodes until all desired nodes in the network receive the request.

4. The method of claim 1, wherein an interface selected for one of the nodes in the particular transmission path is different from an interface selected for another one of the nodes in the particular transmission path that is adjacent to the one of the nodes.

5. The method of claim 1, wherein the particular transmission path is identified despite not being the least costly of the one or more transmission paths.

6. The method of claim 1, further comprising:
   receiving, by the first node, data from one or more nodes in the particular transmission path, the data comprising a listing of interferences experienced by of the one or more nodes reporting the data;
   before transmission of the data packet, adjusting, by the first node, the selection of the interface option for at least one of the reporting nodes based on the received data.

7. The method of claim 1, wherein the interference is caused by self-interference.

8. The method of claim 1, wherein the interference is caused by a hidden terminal interference.

9. The method of claim 1, wherein the network comprising the plurality of nodes is a low power and lossy network (LLN).

10. A tangible, non-transitory, computer-readable media having software encoded thereon, the software when executed by a processor operable to:
- receive a request for interface options from a first node in a network comprising a plurality of nodes;
- transmit the interface options to the first node, the interface options comprising at least a power line communication ("PLC") interface and a radio frequency ("RF") interface;
- receive an indication of a particular interface option to be used when transmitting a data packet in a particular transmission path to a destination node;
- receive a data packet, the data packet comprising a-an address of a destination node to which the data packet is to be sent and the particular transmission path, the data packet being received by a first interface option; and
- communicate the data packet to a subsequent adjacent node in the particular transmission path using the particular interface option specified for the transmitting node, the particular interface option being different from the first interface option.

11. The computer program product of claim 10, the software when executed by a processor being further operable to:
- transmit data comprising a listing of interferences experienced; and
- before receiving the data packet, receiving an adjustment of the selection of the interface option for the transmission path based on the transmitted data.

12. The computer program product of claim 10, wherein the particular interface option specified is a different interface than the interface option specified for an adjacent node.

13. The computer program product of claim 10, wherein the identified particular transmission path is not the shortest of the one or more transmission paths.

14. The computer program product of claim 11, wherein the interference is caused by self-interference.

15. A system, comprising:
- a processor adapted to execute one or more processes; and
- a memory configured to store a process executable by the processor, the process when executed operable to:
  - determine interface options of a first node; and
  - transmit a request for interface options to each of a plurality of nodes in the network, the interface options for each of the plurality of nodes comprising at least a power line communication ("PLC") interface and a radio frequency ("RF") interface;
  - receive a data packet, the data packet identifying a destination node in the network to which the data packet is to be sent;
  - select a particular transmission path from the first node to the destination node, based on a determination that the selected transmission path will introduce a least number of interferences compared to one or more other transmission paths, each transmission path comprising a particular interface option for each of at least one node between the first node and the destination node;
  - indicate to each node in the selected transmission path, the particular interface option for that node in the particular transmission path; and
  - transmit the data packet to the destination node via the particular transmission path,
- wherein each node in the particular transmission path communicates the data packet to a subsequent adjacent node using the particular interface option specified for the transmitting node.

16. The system of claim 15, wherein the interference is caused by self-interference.

17. The system of claim 15, wherein the interference is caused by a hidden terminal interference.

* * * * *